United States Patent [19]

Toyama

[11] Patent Number: 4,488,055
[45] Date of Patent: Dec. 11, 1984

[54] FLUID PIPE GENERATOR

[76] Inventor: James Toyama, 1980 Cedar Ave., Long Beach, Calif. 90806

[21] Appl. No.: 356,629

[22] Filed: Mar. 10, 1982

[51] Int. Cl.³ .......................... F01P 3/12; F03D 1/04; H02K 7/18; F16D 31/00
[52] U.S. Cl. ...................................... 290/53; 290/42; 60/329; 415/55; 416/185; 417/348
[58] Field of Search ...................... 290/42, 43, 52, 53, 290/54; 415/55, 91, 116, 213 B, 219 C, 122 A, 87; 417/348, 349; 60/329, 330, 335, 398, 911; 416/185, 188, 187, 197 A, 197 B

[56] References Cited

U.S. PATENT DOCUMENTS

| 96,573 | 12/1869 | Fredenburr et al. | 416/197 B |
| 114,959 | 5/1871 | Morehouse | 416/197 A |
| 685,089 | 10/1901 | Barnett | 416/197 A |
| 904,892 | 11/1908 | Pattosien | 290/54 |
| 2,097,286 | 10/1937 | McGee | 290/54 |
| 2,276,714 | 3/1942 | Brown | 290/54 |
| 2,436,683 | 2/1948 | Wood, Jr. | 290/54 |
| 3,867,655 | 2/1975 | Stengel et al. | 417/349 X |
| 4,053,253 | 11/1977 | Coffer | 290/54 X |
| 4,057,270 | 11/1977 | Lebost | 290/54 |
| 4,095,422 | 6/1978 | Kurakake | 290/54 X |
| 4,095,918 | 6/1978 | Mouton, Jr. et al. | 290/54 X |
| 4,142,367 | 3/1979 | Guisti | 60/325 |
| 4,182,123 | 1/1980 | Ueda | 290/54 X |
| 4,188,546 | 2/1980 | Kossler | 290/54 X |
| 4,246,753 | 1/1981 | Redmond | 290/43 X |
| 4,272,685 | 6/1981 | Toyama | 290/52 |
| 4,295,783 | 10/1981 | Lebost | 290/54 X |
| 4,385,594 | 5/1983 | Hauser, Jr. | 415/87 X |

FOREIGN PATENT DOCUMENTS 2732552 2/1979 Fed. Rep. of Germany ........ 290/54

Primary Examiner—A. T. Grimley
Assistant Examiner—Terry Flower
Attorney, Agent, or Firm—Leonard Bloom

[57] ABSTRACT

A fluid motor consisting essentially of a housing mounted on a water pipe and containing a vaned disc which functions as a paddle wheel whereby fluid moving through the conduit engages the vanes driving the disc and an output shaft associated therewith which in turn is utilized to drive a generator and produce an electric current.

15 Claims, 2 Drawing Figures

FLUID PIPE GENERATOR

BACKGROUND OF THE INVENTION

The present invention relates generally to collection of hydroelectric power and more specifically to an inline paddle wheel driven by fluid motion in a water conduit and represents further developments regarding my U.S. Pat. No. 4,272,685.

As the demand for energy increases, so do the costs, and it becomes necessary to avoid energy waste by employing co-generation techniques. One such method is to take advantage of the kinetic energy available from fluid motion. For example, the water pressure in a typical water pipeline that supplies a household ranges between 80 to 100 psi. The excessive pressure ensures an ample water supply for households located at various altitudes in relation to the pumping source. Therefore, it is possible to tap this source of kinetic energy and convert it to electrical energy, which is well known in the prior art.

The following patents reflect the state of the art of which applicant is aware insofar as they appear germane to the patent process: U.S. Pat. Nos. 2,436,683, Wood, Jr., 3,867,655, Stengel et al., 4,142,367, Guisti, 4,182,123, Ueda, 4,246,753, Redmond.

Of the references cited, the patent to Guisti would appear to be of interest since he teaches the use of a fluid motor including a rotatable output shaft having a fluid inlet and a fluid outlet whereby the water pressure associated with the domestic water system can be harnessed to provide an electrical output which is thereafter stored in a bank of batteries.

Similarly, the patent to Wood, Jr. teaches the use of a generator for pipelines in which a rotor is mounted within the pipeline itself, and a plurality of blades on the rotor are adapted to rotate in response to the current of the fluid contained within the pipeline thereby providing an electrical output.

The instant invention is distinguished in that a vaned disc is contained within a housing which is easily mounted upon an existing fluid pipeline. Therefore, retrofitting is easily accomplished without any serious interruption in service. Furthermore, the instant invention employs a paddle wheel disc in which only a portion of the vanes engage the moving fluid aerodynamically which ensures that the device according to the instant application does not present a substantial encumbrance upon fluid motion.

The remaining references show the state of the art further.

SUMMARY AND OBJECTS OF THE INVENTION

Accordingly, it is a primary object of the present invention to provide a novel fluid motor which employs the kinetic energy associated with the fluid motion in a water conduit to generate an electrical current.

It is another object of the present invention to provide a novel fluid motor which may be readily retrofitted and connected to existing water systems as well as incorporated in newly constructed water systems.

It is a further object of the present invention to provide a novel fluid motor which does not substantially interrupt the fluid motion present in a domestic water supply system.

It is yet another object of the present invention to provide a novel fluid motor which can be employed on the output side of a water system and take advantage by gravity of the flowing fluid contained therein.

These and other objects are accomplished by the provision of a housing readily applied to a water conduit containing a paddle wheel disc, the vanes of which are rotationally driven by the motion of a fluid moving through a pipe communicating with the conduit.

These and other objects will be made manifest when considering the following detailed specification when taken in conjunction with the appended drawing figures.

DESCRIPTION OF THE PREFERRED EMBODIMENT

Figure 1:
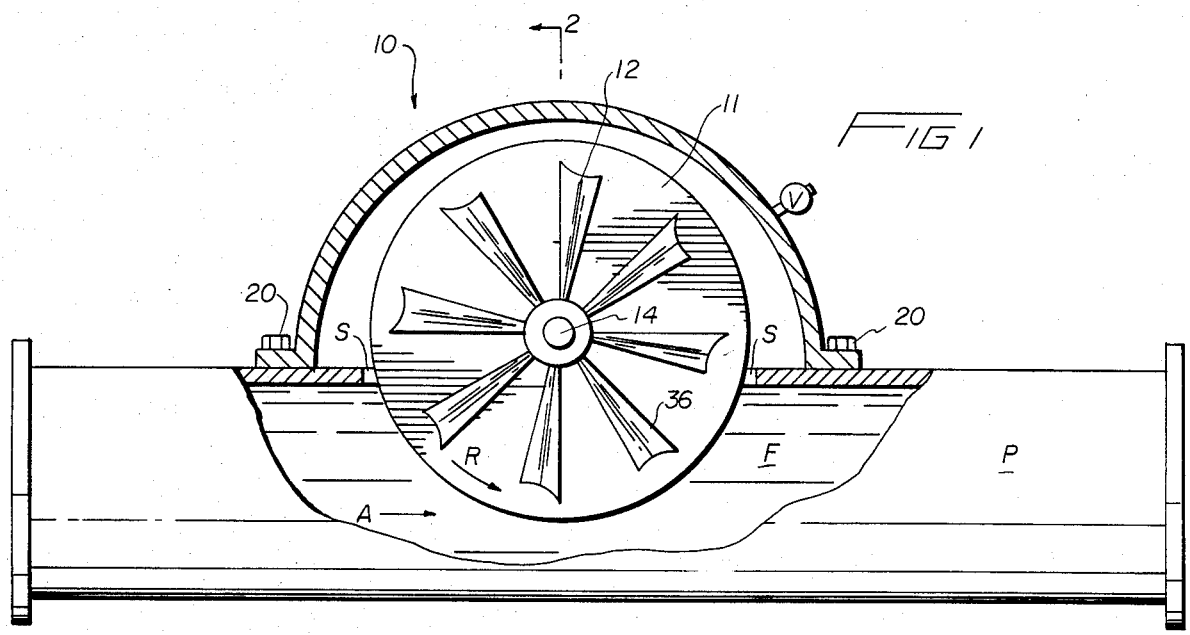
FIG. 1 is partial sectional side view of the invention as it would be applied to a typical water conduit.

Referring now to the drawings in detail wherein like reference numerals represent like parts throughout the several figures, reference numeral 10 refers generally to the device according to the instant invention.

As shown in FIG. 1 the invention employs a disc 11 supporting a plurality of radially disposed transversely extending vanes 12. The vanes 12 may be cast or molded integrally with the disc 11 or secured thereto in any suitable manner; and as shown more clearly in FIG. 2, the vanes 12 extend laterally from both sides of the disc 11. The disc 11 is fixed to and supported on a shaft 13 which in turn is rotatably supported on an end 14 and a medial portion 15 by bearings 16. The bearings 16 are each contained within a cap 17 which is mounted on the outside of a large housing 18 which is semi-circular in section and contains the disc 11 and a portion of the shaft 13. The housing 18 has an arcuate flange 19 which is bolted with bolts 20 to a water pipe P in order to mount the device 10 on arcuate top wall 26 and planar side walls 25. The disc 11 has a centrally disposed transverse collar 21 to receive the shaft 13. The collar 21 receives plural pins or screws 22 to mount the disc 11 on the shaft 13. The output end of the shaft 13 is provided with a step-down square protrusion 23 which mates with a socket 24 to drive a generator G.

In use and operation the fluid F passing through the pipe P engages the vanes 12 on the disc 11 thereby rotating the disc 11 in the shaft 13 upon which it is fixed. Anytime the fluid F is moving through the pipe P with sufficient vigor the disc 11 is driven. When the disc 11 is driven the shaft 13 drives the generator G thereby producing an electric current.

Figure 2:
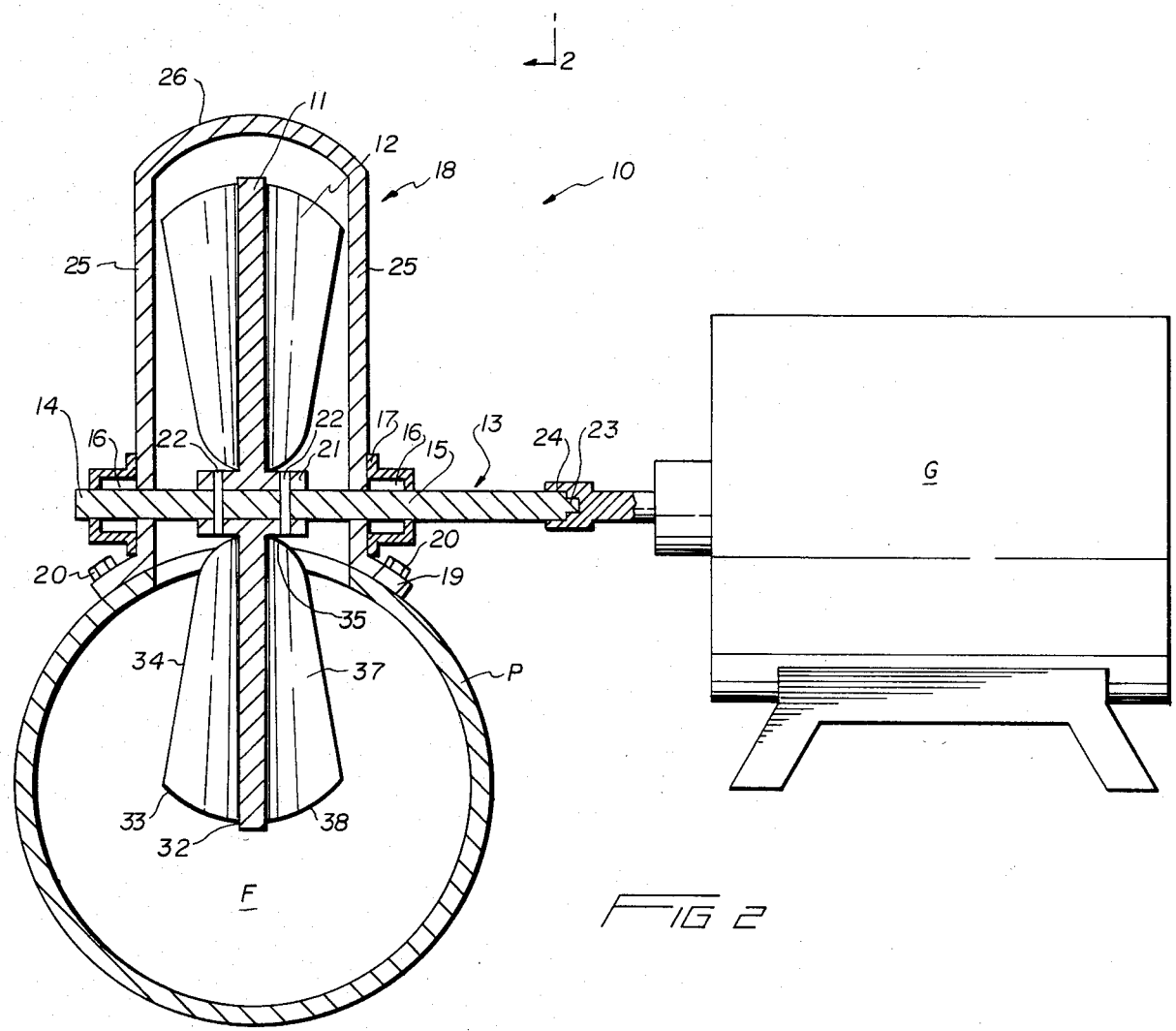
FIG. 2 is an end sectional view of the instant device also displaying the output shaft engaging an electrical generator.

Further fluid F flowing in the direction of the arrow A within the pipe or conduit P impinges upon and reacts against the vanes 12 disposed upon the disc 11. Consequently, the vane's reaction to the fluid flow in the direction A imparts a rotation upon the disc 11 in the direction of the arrow R. For convenience, as shown in FIGS. 1 and 2, the fluid flow direction is taken from left to right, and the disc rotation is taken counter-clockwise. The unique configuration of the vanes is such that a maximum rotative force is imparted to the disc through the vanes while simultaneously not imparting any back pressure within the fluid flow system so as to retard the fluid flow. To this end, it is to be noted, especially in FIG. 2, that the vanes are configured so that an axis of symmetry exists about the disc 11, on either side thereof, the vanes taking the following form: a terminal portion of the blade 32 is provided just below a peripheral rim of the disc, so that a notched or stepped area is provided, and the vanes taper outwardly and towards the shaft in an arcuate path as shown at 38 until a side edge portion of the vane has been approached, see reference numeral 33. It has been found that the arcuate segment 38 can be preferably of parabolic or elliptical contour, but this should not be considered as a limitation. Side walls 34 of the vane are substantially linear in shape and taper inwardly towards the shaft 13 as shown in FIG. 2, the linear portion 34 terminating in a root section 35 having an arcuate segment stopping where the collar 21 and the disc stem coincide. While it has been determined that the root curve is most beneficially parabolic, this should not be construed as a limitation. As shown by the shading, the vanes have two sides, a back side 36 and a forward side 37, the distinction being that the forward side 37 addresses the fluid flow A and is substantially concave so that that surface will react most beneficially imparting the greatest amount of rotational force to the shaft 13. The convex back side 36 therefore provides an airfoil type of contour which minimizes the resistance of the vanes as it spins and also provides a second function. As pointed out hereinabove, the disc and vane assembly only extends partially within the pipe P thereby providing a lowermost portion in the pipe that does not contact the vaned disc. Additionally, the housing 18 includes an upper portion that is not readily influenced by the fluid flow. To this end, a resilient sealing means S can be provided at the interface between the vaned disc and the point of penetration into the pipe P as shown in FIG. 1. Alternatively, the upper portion of the housing 18 can be under pressure which retards the migration of fluid therewithin. Clearly, the nature of this device would suggest that as time went on, a portion of the fluid may migrate into the upper housing 18, and a purging device has been provided indicated by valve V in which pressure is applied to the housing upper portion to discourage the migration of fluid therewithin. In this way, the concave portion of the vane addresses the fluid flow in a most beneficial manner, the leading edge 32 of the vane contacting the fluid flow initially and imparting a vigorous spin to the disc 11. When the vane moves back into the upper housing portion, the convex side 36 allows the vane to enter therewithin without carrying an excessive amount of fluid within the upper housing in combination with the air pressure source.

Having thus described the preferred embodiment of the invention, it should be understood that numerous structural modifications and adaptations may be resorted to without departing from the spirit of the invention.

What is claimed is:

1. A fluid motor for use in conjunction with a liquid containing pipe comprising, in combination, a housing with a disc having vanes contained therein, said disc centrally mounted on a shaft supported in said housing in such a position so that said disc extends only partially into the pipe, said vanes on side faces of said disc to engage the liquid passing through the pipe whereby liquid motion through the pipe causes rotation of said disc and said shaft associated therewith, wherein said vane includes a leading edge proximate to but just below a peripheral rim portion of said disc, said leading edge tapering away from said peripheral rim in an arcuate fashion, to a side edge of said vane, wherein said side edge includes a substantially linear portion tapering and narrowing towards said shaft, terminating in an arcuate root portion at a base area of said vane, wherein said vane has a concave front face and a convex back face relative to the direction of liquid flow to enhance the fluid flow rate, and wherein said housing includes a pressurized upper area, sealing means interposed between the pipe and said housing, such that liquid flow migration within said housing is retarded.

2. The device of claim 1, wherein said housing includes arcuate flanges for mounting said housing to the pipe.

3. The device of claim 2, wherein said housing is further provided with caps containing bearings to rotatably mount said shaft.

4. The device of claim 3, wherein said disc is provided with radially disposed vanes on both sides thereof.

5. The device of claim 4, wherein said shaft extends from said housing and is provided with a protrusion to engage and drive a generator.

6. The device of claim 5, wherein said disc is provided with a centrally disposed collar and pins to mount said disc on said shaft.

7. The device of claim 6, wherein said housing includes first and second upwardly extending spaced parallel side walls emanating from said arcuate flanges, and a curved top wall connecting said side walls.

8. In a power generator, the combination comprising:
a conduit through which non-compressible fluid is adapted to pass under pressure,
a housing associated therewith in communication with an interior of said conduit having gaseous pressure of sufficient magnitude to prevent the migration of non-compressible fluid therewithin,
means extending from said housing into said conduit adapted to be driven by the non-compressible fluid as it passes thereby,
means for power extraction operatively coupled to said driven means whereby the motion of said non-compressible fluid drives said power generating means, wherein said driven means includes a disc supported on a shaft and rotatably coupled thereto so that rotation of said disc rotates said shaft, vanes on opposed sides of said disc having a leading edge proximate to but just below a peripheral rim portion of said disc, said leading edge tapering away from said peripheral rim in an arcuate fashion, side edges of said vanes tapering linearly towards said shaft and a terminal portion thereof defining a root area which tapers in an arcuate manner, said vanes having a concave front face and a convex back face for efficiency in extracting energy from the non-compressible fluid passing and impinging thereagainst.

9. The device of claim 8, wherein said housing includes an access port for admitting gaseous pressure therein, said housing adapted to be retrofitted on an existing conduit.

10. A fluid motor for use in conjunction with a liquid containing pipe comprising, in combination, a housing with a disc having vanes contained therein said disc centrally mounted on a shaft supported in said housing in such a position so that said disc extends only partially into the pipe, said vanes on side faces of said disc to engage the liquid passing through the pipe whereby liquid motion through the pipe causes rotation of said disc and said shaft associated therewith wherein said vane includes a leading edge proximate to but just below a peripheral rim portion of said disc, said leading edge tapering away from said peripheral rim in an arcuate fashion, to a side edge of said vane wherein said side edge includes a substantially linear portion tapering and narrowing towards said shaft, terminating in an arcuate root portion at a base of said vane wherein said vane has a concave front face and a convex back face relative to the direction of liquid flow to enhance the fluid flow rate wherein said housing includes a pressurized upper area, sealing means interposed between the pipe and said housing, such that liquid flow migration within said housing is retarded wherein said housing includes arcuate flanges for mounting said housing to the pipe.

11. The device of claim 10 wherein said housing is further provided with caps containing bearing to rotatably mount said shaft.

12. The device of claim 11 wherein said disc is provided with radially disposed vanes on both sides thereof.

13. The device of claim 12 wherein said shaft extends from said housing and is provided with a protrusion to engage and drive a generator.

14. The device of claim 13 wherein said disc is provided with a centrally disposed collar and pins to mount said disc on said shaft.

15. The device of claim 14 wherein said housing includes first and second upwardly extending spaced parallel side walls emanating from said arcuate flanges, and a curved top wall connecting said side walls.

* * * * *